(12) United States Patent
St. Amant

(10) Patent No.: US 11,474,774 B2
(45) Date of Patent: Oct. 18, 2022

(54) ENVIRONMENTAL CONTROL OF AUDIO PASSTHROUGH AMPLIFICATION FOR WEARABLE ELECTRONIC AUDIO DEVICE

(71) Applicant: Arm Limited, Cambridge (GB)

(72) Inventor: Renee Marie St. Amant, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/103,744

(22) Filed: Nov. 24, 2020

(65) Prior Publication Data
US 2022/0164157 A1 May 26, 2022

(51) Int. Cl.
*G06F 3/16* (2006.01)
*H04R 5/04* (2006.01)

(52) U.S. Cl.
CPC ............... *G06F 3/165* (2013.01); *H04R 5/04* (2013.01)

(58) Field of Classification Search
CPC .................................. G06F 3/165; H04R 5/04
See application file for complete search history.

(56) References Cited

U.S. PATENT DOCUMENTS

| | | | |
|---|---|---|---|
| 9,509,269 B1* | 11/2016 | Rosenberg | H03G 3/32 |
| 2015/0222977 A1 | 8/2015 | Angel, Jr. | |
| 2016/0028356 A1* | 1/2016 | Eltoft | H04R 1/1041 381/105 |
| 2018/0165922 A1 | 6/2018 | Hunt et al. | |
| 2018/0249250 A1 | 8/2018 | Pate et al. | |
| 2019/0362738 A1* | 11/2019 | Mei | H04R 29/001 |
| 2020/0241834 A1* | 7/2020 | Boeen | G06F 3/165 |
| 2020/0296510 A1 | 9/2020 | Li et al. | |
| 2021/0266655 A1* | 8/2021 | Patel | H04R 1/1041 |

OTHER PUBLICATIONS

Notification of Transmittal of the International Search Report and the Written Opinion of the International Searching Authority, or Declaration, App. No. PCT/EP2021/025458, dated Mar. 11, 2022, 21 Pages.

* cited by examiner

*Primary Examiner* — Fan S Tsang
*Assistant Examiner* — David Siegel
(74) *Attorney, Agent, or Firm* — Berkeley Law & Technology Group, LLP

(57) ABSTRACT

Subject matter disclosed herein may relate to wearable electronic audio devices and may relate more particularly to enabling environmental audio passthrough amplification for wearable electronic audio devices responsive to detection of particular environmental audio events.

18 Claims, 7 Drawing Sheets

ENVIRONMENTAL CONTROL OF AUDIO PASSTHROUGH AMPLIFICATION FOR WEARABLE ELECTRONIC AUDIO DEVICE

BACKGROUND

Field

Subject matter disclosed herein may relate to wearable electronic audio devices and may relate more particularly to enabling environmental audio passthrough amplification for wearable electronic audio devices responsive to detection of particular environmental audio events.

Information

Audio is becoming an increasingly evident aspect of everyday life for many individuals through the use of earbuds, headphones, virtual and/or augmented reality headsets or other wearable electronic audio devices, for example. Advancements in various technologies (e.g., battery life) may provide a capability for individuals to wear wireless earbuds or headphones, for example, for extensive periods of time and/or in a wide range of circumstances.

However, wearable electronic audio devices such as earbuds or headphones, for example, may substantially attenuate environmental sounds, such as via electronic and/or physical means. For example, some types of earbuds or headphones, for example, may implement active noise cancelling technologies. Other types of earbuds or headphones, for example, may at least partially block environmental sounds from reaching a user's eardrum due to the physical characteristics of the earbuds or headphones. That is, wearing something, such as earbuds or headphones, in or on one's ear may reduce one's ability to hear environmental sounds. Further, when wearing wireless earbuds or headphones, for example, a user may frequently listen to amplified audio content (e.g., music, telephone conversation, video soundtrack, etc.) streamed from an external device, such as a cellular phone, computing device, television, audio/visual system, etc., thereby further reducing the user's ability to hear environmental sounds.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
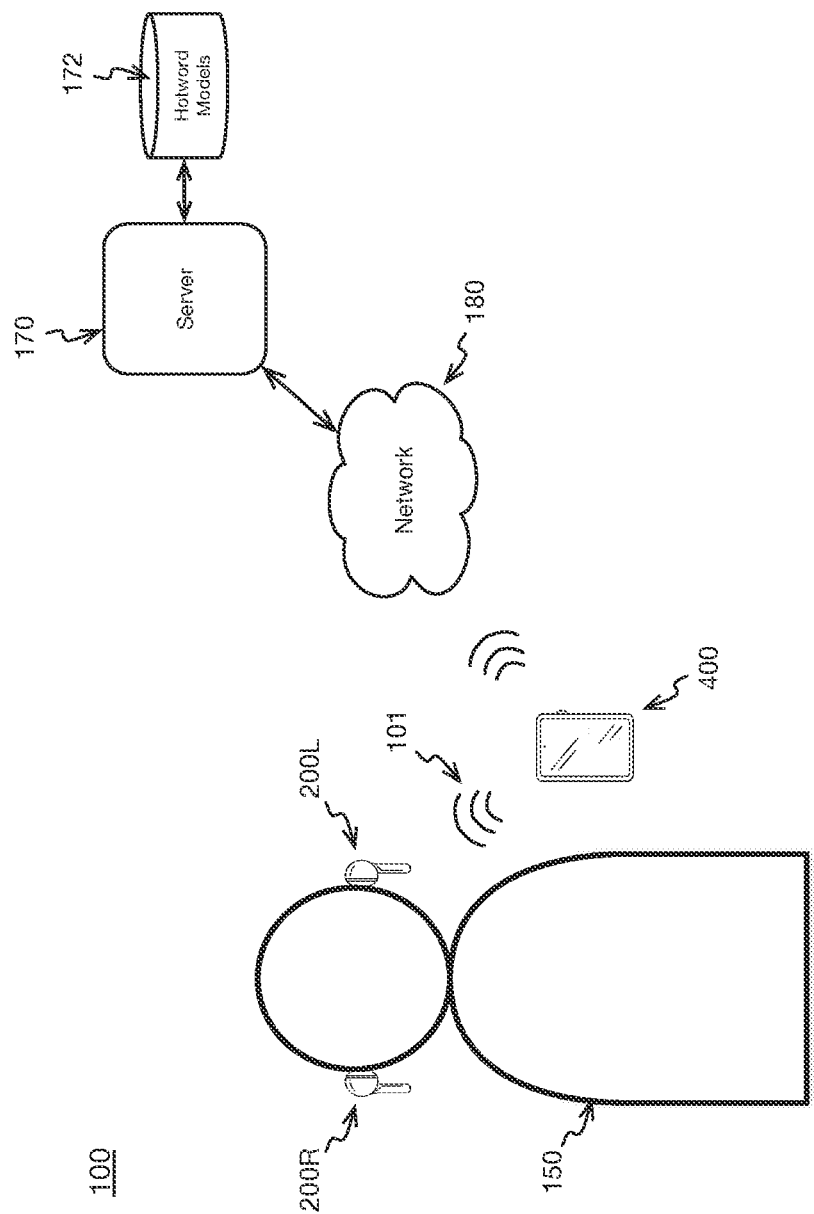
FIG. 1 is an illustration depicting an embodiment of example wearable electronic audio devices in an example environment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, audio is becoming an increasingly evident aspect of everyday life for many individuals through their use of earbuds, headphones, virtual and/or augmented reality headsets or other wearable electronic audio devices, for example. Advancements in various technologies (e.g., battery life) may provide a capability for individuals to wear wireless earbuds or headphones, for example, for extensive periods of time and/or in a wide range of circumstances.

However, wearable electronic audio devices, such as earbuds or headphones, for example, may substantially attenuate environmental sounds, such as via electronic and/or physical means. For example, some types of wearable electronic audio devices may implement active noise cancelling technologies. Other types of wearable electronic audio devices may at least partially block environmental sounds from reaching a user's eardrum(s) due to the physical characteristics of the wearable electronic audio devices. That is, wearing an electronic audio device, such as earbuds or headphones, for example, may reduce one's ability to hear environmental sounds. Further, when wearing wireless earbuds or headphones, for example, a user may frequently listen to amplified audio content (e.g., music, telephone conversation, video soundtrack, etc.) streamed from an external device, such as a cellular phone, computing device, television, audio/visual system, etc., thereby further reducing the user's ability to hear environmental sounds. Therefore, wearing wireless earbuds or headphones, for example, for extended periods of time and/or in a range of circumstances may result in a decrease of a user's awareness of events occurring in the user's immediate environment. For example, wearing wireless earbuds and/or headphones may have a negative impact on a user's ability to engage in conversation, to react to hazardous situations, to hear announcements, etc.

In some circumstances, wireless earbuds, for example, may provide for passthrough amplification of environmental sounds. "Environmental audio passthrough amplification" refers to a mode of operation for wearable electronic audio devices, such as wireless earbuds or headphones, for example, whereby environmental sounds are amplified and provided to a user's ear(s) to allow the user to hear environmental sounds. In some circumstances, an environmental audio passthrough amplification mode of operation may include ceasing non-environmental audio sources (e.g., streaming audio via a Bluetooth connection) from being amplified and provided to a user's ears. In some circumstances, an environmental audio passthrough amplification mode of operation for a wearable electronic audio device (e.g., earbud(s), headphones, etc.) may be initiated via explicit user interaction with a user interface on the wearable electronic device (e.g., pushbutton, switch, etc.) and/or via explicit user interaction with an app (i.e., application) on a mobile device. Whether via pushbuttons or switches on a wearable electronic device and/or via interaction with an app on a mobile device or other computing device, explicit, attentive, purposeful and timely engagement by a user is required to initiate an environmental passthrough mode.

However, because a user may not be aware of events occurring in the user's environment due to a reduced ability to hear environmental sounds, the user may never be aware of an opportunity to engage an environmental audio passthrough amplification mode of operation that would allow the user to react in a timely fashion to a hazardous situation, to take advantage of an opportunity for conversation, to hear an announcement, etc. For example, if a user is listening to music via wireless earbuds or headphones, the user may not hear his or her name being spoken in the user's vicinity by an unseen individual and the user may miss an opportunity to respond to the other individual. Alternatively, a user may preemptively place a wearable electronic audio device in an environmental audio passthrough mode. However, in such a circumstance, the user is continuously exposed to environmental sounds which may negatively impact the individual's listening experience, for example. Thus, devices, systems and/or methods for initiating an environmental audio passthrough amplification mode of operation in wearable electronic audio devices without requiring timely and/or explicit action on the part of a user would be beneficial.

To address at least some of the challenges mentioned above, and as described more fully below, embodiments may include circuitry for wearable electronic audio devices, such as wireless earbuds or headphones, for example, to detect particular environmental audio events and, at least in part in response to such a detection, initiate a change in an audio mode of operation for a wearable electronic audio device. For example, detecting particular environmental events may include processing audio signals picked up by one or more sensors (e.g., microphone) in accordance with one or more "hotword" models. In embodiments, hotword detection may occur at a wearable electronic audio device. For example, wearable electronic audio devices may comprise one or more processors substantially dedicated to hotword detection.

As utilized herein, "hotword" and/or the like refers to any specified audio event that may be represented by digital content (e.g., signals and/or states representative of sets of parameters). Example types of hotwords may include, but are not limited to, individual's names or other specified spoken words, sirens or other emergency audio signals, safety device signals, animal sounds (e.g., dog barking), machine-detectable sounds (e.g., outside of the range of human hearing), etc. Further, "hotword model" and/or the like refers to digital content (e.g., signals and/or states representative of sets of parameters) that may be processed in conjunction with digital audio content derived from one or more sensors to detect specified hotwords.

FIG. 1 is an illustration depicting an embodiment of example wearable electronic devices 200L and 200R in an example environment 100. As depicted, a user 150 may wear electronic audio devices, such as wearable electronic audio devices 200L and 200R. "Wearable electronic audio device" and/or the like refer to electronic device types that may be worn by a user at least partially in, on and/or over at least one of the user's ears and that impart particular responses in one or more audio drivers (i.e., electrical-to-acoustic transducer) to enable a user to hear particular audio signals. Example wearable electronic audio device types may include, but are not limited to, earbuds, earphones, in-ear monitors, headphones, virtual reality (VR) headsets, augmented reality (AR) headsets, etc. In a particular implementation, wearable electronic audio devices 200L and/or 200R may comprise wireless earbuds. However, although example implementations of wearable electronic audio devices may be described herein as comprising earbuds, claimed subject matter is not limited in this respect. In implementations, "earbuds" and/or the like refer to wearable electronic audio devices that may be worn in or on a user's ear outside of the ear canal. In other implementations, "earphones," "in-ear monitors" and/or the like refer to wearable electronic audio devices that may be worn on or in a user's ear and extending at least in part into the user's ear canal. Further, "headphones" and/or the like refer to wearable electronic audio devices that may be worn on or over at least one of a user's ears, in implementations. In other implementations, "virtual reality (VR) headsets" and/or "augmented reality (AR) headsets" and/or the like refer to wearable electronic audio devices that may be worn at least partially in, on and/or over at least one ear and that also incorporate visual display capabilities.

In an implementation, user 150 may carry and/or otherwise control a mobile device, such as mobile device 400. "Mobile device" and/or the like refers to an electronic and/or computing device that may from time to time have a position or location that changes. Example mobile device types may include, but are not limited to, cellular telephones, wearable devices (e.g., watches), personal digital assistants, tablet devices, laptop and/or notebook computing devices, key fobs, personal navigation devices, personal entertainment systems, personal gaming systems, etc. Further, in an implementation, mobile device 400 may comprise an IoT-type device. In this context, "IoT-type device" and/or the like refers to one or more electronic and/or computing devices capable of leveraging existing Internet and/or like infrastructure as part of the so-called "Internet of Things" or IoT, such as via a variety of applicable protocols, domains, applications, etc. The IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction.

Mobile device 400 may, in an implementation, communicate with earbuds 200 via a wired and/or wireless connection, such as connection 101. For example, mobile device 400 and earbuds 200 may communicate by way of a wireless Bluetooth® personal area network (PAN), although claimed subject matter is not limited in scope in this respect. In an implementation, mobile device 400 may stream and/or otherwise transmit digital audio content (e.g., music, telephonic audio, etc.) to one or more of earbuds 200L and/or 200R via wired and/or wireless connection 101. Although FIG. 1 depicts two earbuds worn by user 150, some implementations may include single wearable electronic audio devices and other implementations may include two or more wearable electronic audio devices. In an implementation, earbuds 200L and 200R may individually obtain digital audio content and/or other types of digital audio content from mobile device 400, for example. In another implementation, a first of earbuds 200L or 200R may obtain digital audio signals and/or signal packets from mobile device 400 and may communicate at least a portion of the obtained digital audio signals and/or signal packets between the first of earbuds 200L or 200R and a second of earbuds 200L or 200R. For example, "right" earbud 200R may obtain signals and/or states representative of stereo (i.e., two channel) digital audio content from mobile device 400 and may pass a portion (e.g., one channel) of the obtained stereo digital audio content to "left" earbud 200L.

In an implementation, as more fully explained below, one or more of earbuds 200L and/or 200R may comprise one or more processors and/or other circuitry to detect particular environmental audio events and/or to autonomously enable a specified audio mode of operation for one or more of earbuds 200L and/or 200R. As mentioned, detecting a particular environmental audio event may include processing environmental audio signals and/or states in accordance one or more hotword models executed by one or more processors of a wearable electronic device. In an implementation, a co-processor located within one or both of earbuds 200L and 200R, for example, may be at least substantially dedicated to hotword detection operations. In an implementation, a user may wear a single wearable electronic audio device and that single device may include a hotword detection co-processor. In another implementation, each of a pair of wearable electronic audio devices, such as earbuds 200L and 200R, may include a hotword detection co-processor. In an additional implementation, a user may wear a pair of wearable electronic audio devices, such as earbuds 200L and 200R, and one of the pair may include a hotword detection co-processor. For example, earbud 200R may incorporate a co-processor at least substantially dedicated to hotword detection, and, at least in part in response to detecting a particular environmental audio event (e.g., via hotword detection), earbud 200R may signal to earbud 200L that a particular environmental audio event has been detected. Further, in implementations, one or both of earbuds 200L and/or 200R may include circuitry to amplify environmental audio in response to a hotword detection.

As depicted in FIG. 1, mobile device 400 and a server computing platform 170 may communicate over a network 180, in an implementation. Network 180 may comprise, for example, any combination of wired and/or wireless communication links. In a particular implementation, network 180 may comprise, for example, an Internet Protocol (IP)-type infrastructure capable of facilitating or supporting communication between one or more IoT-type devices, such as mobile device 400, and one or more servers, such as server computing platform 170. In another implementation, network 180 may comprise, for example, a cellular communication network infrastructure, such as a base station controller and/or master switching center, for example, to facilitate and/or support mobile cellular communication with mobile device 400. Server computing platform 170 may comprise any suitable servers or combination thereof capable of facilitating or supporting one or more operations and/or techniques discussed herein. For example, server computing platform 170 may comprise one or more update servers, back-end servers, management servers, archive servers, location servers, positioning assistance servers, navigation servers, map servers, crowdsourcing servers, network-related servers, or the like.

In an implementation, a user may specify particular hotwords to be detected by one or more of earbuds 200L and/or 200R and/or may further specify one or more operations to perform by earbuds 200L and/or 200R and/or by mobile device 400 in response to a hotword detection. For example, to specify a particular hotword that, if detected by one or more of earbuds 200L and/or 200R, may enable an environmental audio passthrough amplification mode of operation in one or more of earbuds 200L and/or 200R, a user may interact with a user interface of mobile device 400. In an implementation, mobile device 400 may execute an app that may provide a user interface for the user to specify one or more particular hotwords. For example, if user 150 wishes to have earbuds 200L and/or 200R detect someone in the user's environment speaking the name "Marianne," user 150 may provide an input to an app executed on mobile device 400. Responsive at least in part to the input obtained from user 150, mobile device 400 may communicate with server computing platform 170 to have a hotword model corresponding to the specified hotword "Marianne" retrieved from a hotword storage structure 172. Server computing platform 170 may provide the specified hotword model to mobile device 400 and/or mobile device 400 may provide the specified hotword model to one or more of earbuds 200L and/or 200R.

In another implementation, rather than and/or in addition to specifying one or more hotwords to be retrieved from a stock hotword model store, such as hotword storage structure 172, a user may initiate generation of one or more customized hotwords. For example, if user 150 wishes to have earbuds 200L and/or 200R detect a barking sound from a particular dog (e.g., to allow the particular dog's barking to heard when the user is wearing earbuds 200L and/or 200R), rather than trying stock "dog bark" hotword models, user 150 may initiate generation of a custom hotword model using an app executed on mobile device 400. In an implementation, user 150 may record several samples of dog barks from the particular dog, for example, and an appropriate hotword model may be generated and provided to earbuds 200L and/or 200R. In an implementation, the audio recordings may be transmitted to an external service, such as may be executed at server computing platform 170, for example, and the external service may perform appropriate operations based on the supplied dog barking samples to generate a customized hotword.

In some circumstances, generalized hotword models, such as models designed to detect particular names spoken by as many people in the world as feasible and/or possible, may comprise relatively very large sets of parameters that may utilize relatively very large amounts of storage within a memory device. Customized hotwords, on the other hand, may be designed to detect a narrower range of audio events, such as a particular name spoken by a particular individual. Rather than loading a relatively large generalized hotword model onto a resource-constrained device such as earbuds 200L and/or 200R, for example, a customized hotword model may instead be generated and loaded.

In an implementation, one or more hotword models may be loaded into earbuds 200L and/or 200R during a manufacturing and/or distribution process. Further, for example, additional and/or replacement hotword models may be generated and/or loaded onto earbuds 200L and/or 200R on an as-needed basis as determined by user 150. In other implementations, hotword models may be distributed by various organizations, associations, companies, government departments, etc. For one particular non-limiting example, a municipal mass transit authority may distribute a particular hotword model that may allow users' wearable electronic audio devices to enter an environmental audio passthrough amplification mode whenever announcements are made on the authority's busses, trains, etc. For example, a hotword model distributed by a transit authority may allow earbuds 200L and/or 200R, for example, to detect a particular audio signal that may precede announcements made as a bus, train, etc. is approaching a next stop. Furthermore, audio signals preceding announcements, for example, may be specifically designed for efficient detection by hotword models (e.g., for accurate detection without requiring large models). By detecting the particular preparatory audio signal, earbuds 200L and/or 200R may allow user 150, for example, to hear the subsequent announcements. Note that in this example a device in the environment triggers environmental audio passthrough amplification mode on the user's device. Also, note that user 150 has had to take no explicit action to be able to hear the announcement. User 150 doesn't even need to be aware that such an announcement is forthcoming to be able to have earbuds 200L and/or 200R allow the announcement to be heard by user 150. In another particular implementation, different particular hotwords may be provided for different stops within the particular transit system, for example. In this manner, earbuds 200L and/or 200R may enter an environmental audio passthrough amplification mode to permit user 150 to hear a particular announcement without entering environmental audio passthrough amplification mode for other stops.

In a particular implementation, hotword models may be distributed by organizations, associations, companies, government departments, etc., via a website. Of course, claimed subject matter is not limited in scope to any particular means for distributing hotword models. For the example transit authority example mentioned above, a website may allow a user to specify one or more particular hotwords corresponding to particular stops within a particular transit system. Also, for the transit authority example mentioned above, once a user has uploaded the distributed hotword(s) to the user's earbuds, for example, the user may enjoy full immersion in any audio content being consumed by the user during a commute without having to worry about missing any particular stop(s).

Although some examples discussed herein describe autonomous entry of an environmental audio passthrough amplification mode for earbuds, headphones, etc. in response to detected hotwords, claimed subject matter is not limited in scope in these respects. For example, as mentioned, particular implementations of wearable electronic audio devices may include VR and/or AR headsets. For a particular implementation, rather than merely entering an environmental audio passthrough amplification mode of operation in response to a hotword detection, VR and/or AR headsets may alter a virtual environment and/or may tune a particular augmentation to an environment based at least in part on a hotword detection.

In addition to specifying and/or generating particular hotwords, a user, such as user 150, may specify one or more aspects of an environmental audio passthrough amplification mode triggered via hotword detection. For example, user 150 may specify particular periods of time earbuds 200L and/or 200R may stay in an environmental audio passthrough amplification mode following a hotword detection. In an implementation, different periods of time may be specified for different hotwords. User 150 may specify particular periods of time for an environmental audio passthrough amplification mode to remain active for particular hotwords via a user interface provided on earbuds 200L and/or 200R and/or via a user interface provided by an app executed on mobile device 400, for example. In an implementation, earbuds 200L and/or 200R may comprise one or more pushbuttons, for example, that may be manipulated by user 150 to select modes of operation, to specify particular hotwords, to specify particular periods of time for an environmental audio passthrough amplification mode to remain active, etc. Other parameters that may be specified by user 150, for example, may include adjustments to audio volume for particular hotword detection events, opacity and/or color of visual notification for VR/AR devices, size of text for visual notification for VR/AR devices. Further, user 150 may specify periods of time of the day/night during which autonomous environmental audio passthrough amplification should occur, in an implementation. For example, user 150 may specify for earbuds 200L and/or 200R to refrain from autonomously entering an environmental audio passthrough amplification mode during specified night-time hours. In another implementation, user 150 may specify to reduce a number of active hotwords during particular periods of time in order to save battery life, for example. For another example, different hotwords may be activated for different periods of time during the day, week and/or month. For example, user 150 may specify that during normal sleeping hours earbuds 200L and/or 200R are to activate a particular hotword to detect a smoke detector alarm.

In an implementation, parameters specified by a user for particular hotword detection events may be stored as metadata associated with particular hotwords. For example, user 150 may interact with a user interface on mobile device 400 to specify particular metadata parameters (e.g., audio volume, duration of environmental audio passthrough amplification mode occurrences, etc.) for particular hotwords, and the specified metadata parameters may be provided along with the particular hotword models to earbuds 200L and/or 200R.

In the examples discussed above, a few possible hotword-types have been mentioned. Additional examples may include a kettle whistling, a telephone ring, a self-driving car pedestrian alarm, smart lampposts, etc. Further examples may include smart city safety notification and/or other emergency information broadcasts and/or warnings. Of course, these are merely examples and embodiments may include any of a very wide range of possible hotword types. For the various examples described herein and/or for any of a wide range of other possible examples not specifically mentioned herein, a user may benefit from embodiments and/or particular implementations of autonomous environmental audio passthrough amplification even in circumstances wherein it would be impossible for the user to be aware of the need for and/or the advantages to be gained from entering an environmental audio passthrough amplification mode. For example, a user may benefit from modifications to the user's experience of the user's environment without having to take any explicit action and/or even without being aware of an opportunity to benefit from environmental audio passthrough amplification in that moment. In particular implementations, other than setting a parameter and/or otherwise granting permission in advance to enable a wearable electronic audio device to autonomously enter an environmental audio passthrough amplification mode (e.g., in response to a particular hotword detection as triggered by people and/or devices in the environment), the user takes no explicit, attentive, purposeful and/or timely action to engage an environmental audio passthrough amplification mode.

In some circumstances, wearable electronic devices and/or other digital assistant devices may be utilized to detect a "wake word" (e.g., Siri, Alexa, etc.) and may also be utilized to process a segment of subsequent audio for the purposes of interpreting the content of the subsequent audio. For example, an owner of a wearable electronic device and/or a digital assistance device may speak the words "Siri, turn on the lights." Detection of the word "Siri" would initiate the recording and subsequent processing of "turn on the lights." In such a circumstance, it is the owner of the wearable electronic device and/or digital assistant device that initiates the "wake word" detection by uttering the appropriate word. This differs significantly from example embodiments described herein where hotword detection and subsequent environmental audio passthrough amplification is based on environmental audio events. Particular implementations described herein do not seek to interpret environmental audio for purposes other than for hotword detection in order to enable environmental audio passthrough amplification and/or other environmental awareness actions. In general, embodiments are directed at providing environmental awareness to individuals via hotword detection and/or subsequent actions including, for example, turning down the amplification of non-environmental content, turning off noise-cancellation functions and/or enabling passthrough amplification of environmental audio. For example embodiments, the intention is to solve the problem of a user not knowing when to explicitly change a device mode to allow for enhanced environmental awareness, for example. Such enhanced environmental awareness may be provided in an automated and/or configurable way, as described herein. For example, as described more fully below, hotword models may be dynamically loaded based at least in part on explicit user settings and/or preferences and/or may be loaded based at least in part on other contextual triggers.

Also, for particular implementations, hotword detection may be performed locally—specifically, within a wearable electronic audio device. Once a particular hotword is loaded into a wearable electronic audio device, such as earbuds 200L and/or 200R, no other devices are involved in hotword detection, in a particular implementation. Thus, in particular implementations, earbuds 200L and/or 200R, for example, need not be in communication with any other device to perform autonomous environmental audio passthrough amplification, including hotword detection. Of course, wearable electronic audio devices, such as earbuds 200L and/or 200R, may often be in communication with an external device, such as mobile device 400, to allow a user, such as user 150, to participate in telephonic communication, to consume streaming digital audio content, etc.

Figure 2:
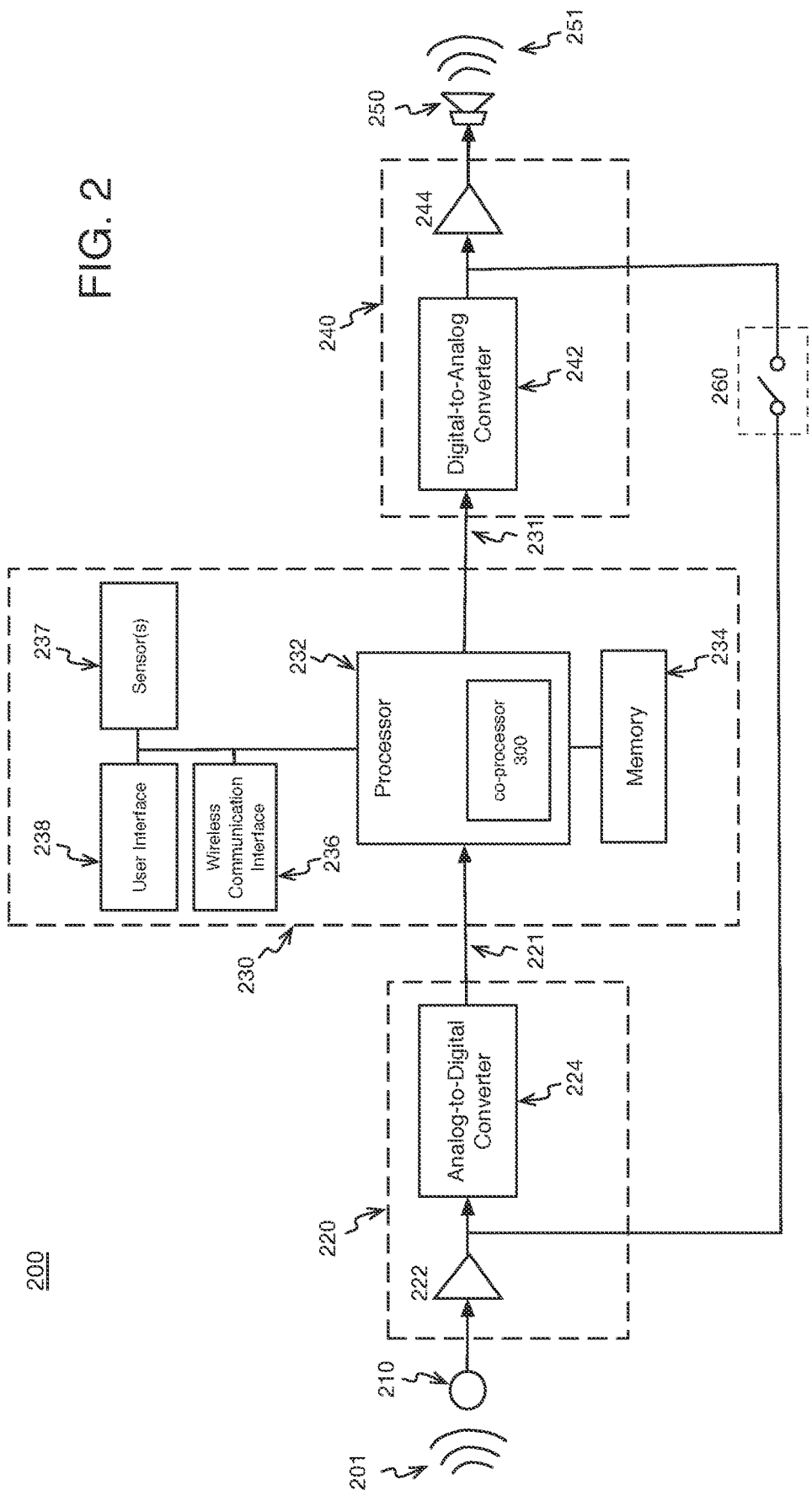
FIG. 2 is a schematic block diagram depicting an embodiment of an example wearable electronic audio device including an example hotword detection co-processor.

FIG. 2 is a schematic block diagram depicting an embodiment 200 of an example wearable electronic audio device including an example hotword (i.e., environmental audio event) detection co-processor 300. Although example wearable electronic audio device 200 is meant to be representative of a wide range of wearable electronic audio device types, the term "earbud" will be used below in connection with device 200 to be consistent with the usage above in connection with devices 200L and/or 200R. However, as mentioned, claimed subject matter is not limited in scope to any other particular type of wearable electronic audio device.

In an implementation, earbud 200 may include one or more processors, such as processor 232 and/or hotword detection co-processor 300, and may further include one or more wireless communication interfaces, such as wireless communication interface 236. Also, in an implementation, earbud 200 may comprise one or more acoustical energy-to-electrical signal transducer transducers, such as microphone 210, and/or may include input circuitry 220. For example, input circuitry 220 may include analog front end circuitry 222 and/or analog-to-digital converter circuitry 224, for example. In an implementation, analog front end 222 may filter and/or otherwise condition audio signals in preparation for an analog-to-digital conversion process, such as may be performed by analog-to-digital converter circuitry 224, for example.

Further, in an implementation, earbud 200 may include output circuitry 240, comprising, for example, digital-to-analog converter circuitry 242 and/or amplification circuitry 244. Earbud 200 may also include one or more output transducers, such as output drivers 250, discussed more fully below.

In an implementation, one or more sound pressure waves, such as sound pressure wave 201, may arrive at earbud 200. In an implementation, sound pressure wave 201 may be converted into an analog electrical audio signal via microphone 210. In an implementation, microphone 210 may be located in and/or on earbud 200, for example. Also, in an implementation, sound pressure wave 201 may comprise a sound pressure waves emanating from one or more environmental sources. Further, in an implementation, an analog electrical audio signal generated by microphone 210 may be converted to one or more digital audio signals and/or states via analog-to-digital conversion circuitry 224. Digital audio signals and/or states derived from environmental audio sources are labeled as digital audio signals 221 in FIG. 2.

At circuitry 230 of FIG. 2, for example, one or more signal processing operations may be performed on one or more signals and/or states, such as environmental audio signals and/or states 221. In an implementation, circuitry 230 may generate one or more digital signals and/states, such as digital audio signals and/or states 231, based, at least in part, on digital audio signals and/or states 221 and based, at least in part, on hotword detection operations that may be performed, at least in part, at co-processor 300. In an implementation, one or more hotword models may be obtained from an external device, such as mobile device 400, via wireless communication interface 236. Hotword models may be stored in a memory device, such as memory 234. In an implementation, memory 234 may comprise a non-volatile memory device.

In an implementation, memory 234 may store firmware that may be executed by processor 232 and/or co-processor 300 to control the various operations of earbud 200. Firmware may be updated via wireless communication interface 236, in an implementation. Further, memory 234 may store metadata associated with one or more hotwords, in an implementation. For example, as described above, a user, such as user 150, may specify one or more parameters pertaining to autonomous environmental audio passthrough amplification for particular hotwords. A user interface, such as user interface 238, may allow a user to provide input related to one or more aspects of earbud 200 operation. Example user inputs that may be provided by a user are provided above. In an implementation, user interface 238 may comprise one or more pushbuttons and/or switches, although claimed subject matter is not limited in scope in these respects.

Based at least in part on one or more hotword models and/or based at least in part on associated metadata, processor 232 and/or co-processor 300 may monitor digital environmental audio signals 221 to detect hotword events. Additional disclosure related to hotword detection may be found below in connection with FIG. 3. In an implementation, processor 232 may execute various digital signal processing operations that may include, for example, noise reduction, audio frequency equalization, low-pass and/or high pass filtering, volume adjustments or summing of two or more digital audio signals, or any combination thereof. Of course, claimed subject matter is not limited in scope to these particular signal processing examples.

In an implementation, processor 232, for example, may control switching circuitry 260 based at least in part on hotword detection operations performed at least in part by co-processor 300. For example, for periods of time wherein no hotword is detected, switching circuitry 260 may be in a higher-impedance state, thereby preventing environmental audio signals from reaching amplification circuitry 244 and/or driver(s) 250. In an implementation, this represents a "normal" mode of operation. Additionally, at least in part in response to an indication of a hotword detection provided by co-processor 300, processor 232 may cause switching circuitry 260 to enter a lower impedance state, thereby allowing environmental audio signals to reach amplification circuitry 244 and/or driver(s) 250.

Although in some implementations environmental audio passthrough amplification mode may be implemented at least in part via switching circuitry 260, other implementations may perform switching operations at processor 232. For example, in particular implementations, switching circuitry 260 may be viewed as a logical switching operation that may be performed in whole or in part by processor 232. In an implementation, at least in part in response to an indication of a hotword detection by co-processor 300, processor 232 may cease to provide digital audio content obtained via wireless communication interface 236 to digital-to-analog conversion circuitry 242 and may instead provide digital environmental audio signals 221 to digital-to-analog conversion circuitry 242. In another implementation, processor 232 may provide both digital audio signals obtained via wireless communication interface 236 and digital environmental audio signals 221 to digital-to-analog conversion circuitry 242 in response to a hotword detection.

In an implementation, digital-to-analog conversion circuitry 242 may generate analog audio signals based at least in part on processed digital audio signals 231 and/or may provide the generated analog audio signals to amplification circuitry 244. Additionally, one or more drivers 250 may convert energy from electrical signals provided by amplification circuitry 244 into sound pressure waves, such as sound pressure waves 251. Of course, sound pressure waves 251 are intended to reach an eardrum of a user, such as user 150, thereby allowing the user to perceive intended audio signals.

In addition to one or more microphones, wearable electronic devices, such as earbud 200, may include one or more other sensors, such as sensors 237. For example, earbud 200 may include one or more global positioning satellite (GPS) receivers, accelerometers, barometers, altimeters, etc., to mention a few non-limiting examples. In particular implementations, hotword detection operations may be based at least in part on and/or may be performed in conjunction with signals obtained from sensor(s) 237.

Additionally, in implementations, an automatic update and/or change of hotword models may be performed at a wearable electronic device, such as earbud 200, in response to signals generated by one or more wearable electronic device sensors, such as sensor(s) 237. In an implementation, one or more sensor(s) 237 may detect a change in context for earbud 200. For example, sensor(s) 237 may detect a change in location, time of day, speed of travel, etc., (e.g., based at least in part on one or more acquired GPS signals). A change in context may also include a change in the weather, to mention another possible example. In an implementation, processor 232 and/or co-processor 300 may initiate an update of one or more hotword models to one or more different hotword models that may be more currently relevant in light of the change in context at least in part responsive to one or more signals from sensor(s) 237. For example, a user may leave the user's home to take a walk. In an implementation, sensor content obtained from sensor(s) 237 may indicate a change in location, time of day, speed of travel, weather, etc., and, in response, processor 232 and/or co-processor 300 may initiate loading into memory 234 of one or more hotword models that may be more relevant to the user's new context. In the situation of a walk, for example, hotword models directed to detection of pedestrian safety signals such as may be generated by a self-driving car pedestrian alarm, smart lampposts, smart city safety notification and/or other emergency information broadcast and/or warning systems, etc., may be obtained and/or loaded to memory 234. Of course, other example hotword model types appropriate for other example user states may be autonomously loaded in response to a change in context (e.g., change in location, time of day, weather, speed of travel, etc.), and subject matter is not restricted to the particular examples mentioned herein.

Additionally, in an implementation, a user may specify particular preferences and/or settings for automatic context-relevant hotword loading via a user interface, such as may be provided via a mobile device, such as mobile device 400, in communication with a wearable electronic device, such as earbuds 200, for example. Also, in particular implementations, hotword models may be updated for a wearable electronic device, such as earbud 200, without having to update device firmware, such as may be stored at memory 234. For example, a firmware update procedure may be executed whereby one or more hotword models may be updated without replacing the entirety of the firmware.

Figure 3:
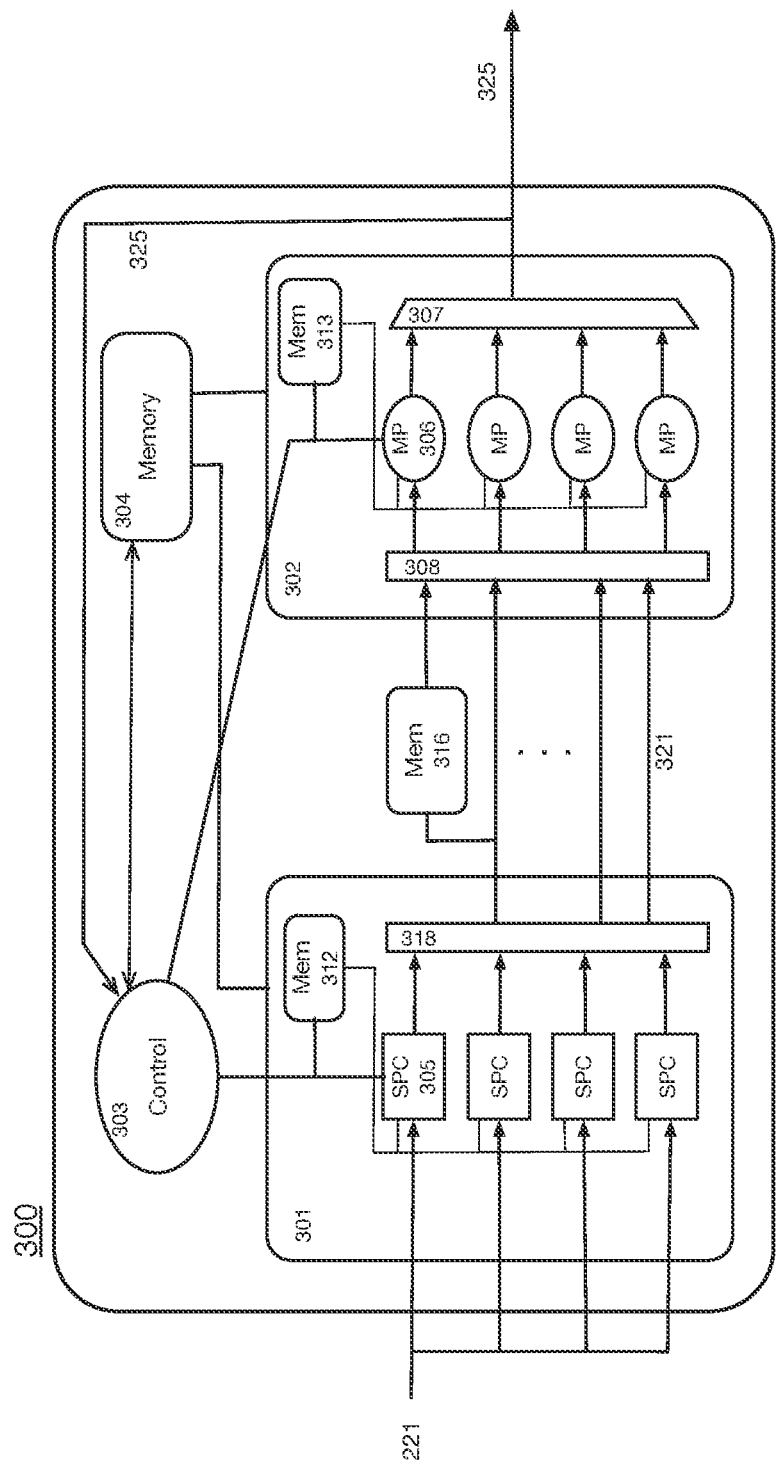
FIG. 3 is a schematic block diagram of an embodiment of an example hotword detection co-processor.

FIG. 3 is a schematic block diagram of an embodiment 300 of an example hotword detection co-processor. In an implementation, hotword detection co-processor 300 may, in general, substantially continuously obtain content from sensors, such as one or more sensors 330, and/or may substantially continuously generate output signals and/or states, such as hotword indication signal 325. Hotword indication signal 325 may be made available to one or more circuits, such as processor 232, for example.

In an implementation, a signal processing stage, such as signal processing stage 301, may obtain digital environmental audio signals 221 from analog-to-digital converter circuitry 224. Further, in an implementation, digital environmental audio signals 221 may be provided to one or more signal processing circuits, such as one or more of signal processing circuits (SPC) 305. In an implementation, SPCs 305 may be configured via one or more control signals, such as control signals communicated between a control unit, such as control unit 303, and SPCs 305. SPCs 305 may prepare digital environmental audio signals 221 for further processing by, for example, a machine (e.g., machine learning, in an implementation) processing stage, such as machine processing stage 302. In an implementation, SPCs 305 may process signals 221 based, at least in part, on one or more control signals obtained from control unit 303 and/or from a memory, such as memory 312, for example. In an implementation, SPCs 305 may be configured to operate individually or in one or more various combinations. SPCs 305 may perform, individually and/or in cooperation, any of a variety of operations that may be specified and/or implemented. Such operations may include, for example, combining signals and/or states, adjusting timing of signals and/or states, performing noise reductions and/or other signal reduction operations, and/or normalizing content, to list but a few examples. Also, although particular implementations may include digital audio signals as inputs to SPCs 305 and/or may include co-processor 300 implemented with digital circuitry, other implementations may include input to SPCs 305 that may comprise analog audio signals in addition to or instead of digital signals. For example, in an implementation, co-processor 300 may be implemented with analog and/or mixed-signal (i.e., analog and digital) circuitry.

In an implementation, content steering circuitry, such as content steering circuitry 318, may direct signals and/or states generated by one or more SPCs 305 to machine processing stage 302. Signals and/or states 321 generated by SPCs 305 may also be stored, at least temporarily, in a memory, such as memory 316, for example. In an implementation, memory 316 may comprise a buffer, such as a first-in, first-out buffer, for example, although claimed subject matter is not limited in scope in this respect. In an implementation, content steering circuitry, such as content steering circuitry 318, may direct signals and/or states based, at least in part, on one or more control signals obtained from control circuit 303 and/or from memory 312, for example.

Machine processing stage 302 may include steering circuitry 308 that may direct signals and/or states 321 to one or more machine processing (MP) circuits 306, for example. In an implementation, steering circuitry 308 may direct signals and/or states 321, based, at least in part, on one or more control signals obtained from control circuit 303 and/or from a memory 313.

In an implementation, machine processing circuits 306 may be configured via one or more control signals, such as control signals communicated between control circuit 303 and machine processing circuits 306. In an implementation, one or more machine processing circuits 306 may be configured to operate individually or in one combination with one or more other machine processing circuits. In an implementation, individual machine processing circuits 306 may implement particular machine-operation techniques, including, for example, neural network technologies. In an implementation, machine processing circuits 306 may comprise multiply/add arithmetic circuits and/or feature extraction circuits that may process, at least in part, sets of parameters representative of one or more hotword models. For example, in an implementation, machine processing circuits 306 may process signals and/or states 321 derived at least in part from digital environmental audio signals 321 in accordance with one or more sets of parameters representative of one or more hotword models to detect occurrences of specified environmental audio events. In an implementation, individual machine processing circuits 306 may operate in accordance with particular hotword models. Thus, for an example implementation implementing four machine processing circuits 306, hotword detection operations may be performed for as many as four different hotword models substantially concurrently. Of course, subject matter is not limited in scope in these respects.

Steering/selecting circuitry 307 may select one or more signals generated by one or more machine processing circuits 306 and/or may combine multiple signals and/or states generated by machine processing circuits 306 to produce one or more hotword indication signals 325, in an implementation. In Further, steering/selecting circuitry 307 may direct one or more hotword indication signals 325 to processor 232, for example. Also, in an implementation, control circuit 303 may be provided one or more hotword indication signals 325. In an implementation, hotword indication signal 325 may comprise a single signal and/or state representative of the combined outputs of machine processing circuits 306. However, in other implementations, hotword indication signal 325 may comprise multiple signals and/or states that may indicate detection of multiple hotwords.

In an implementation, control unit 303 may configure and/or control one or more aspects of hotword detection co-processor 300. In an implementation, control unit 303 may obtain inputs from a variety of sources and/or may control various aspects of hotword detection co-processor 300 based, at least in part, on obtained inputs. Various aspects of hotword detection co-processor 300 may be configured and/or reconfigured based at least in part on parameters that may be stored in a memory, such as memory 304. For example, control unit 303 may communicate with memory 304 to obtain configuration parameters for hotword detection co-processor 300.

Although example hotword detection co-processor 300 is depicted having particular memory devices, such as memories 304, 312, 314, and/or 316, other implementations may include memory elements distributed in various areas of co-processor 300. For example, memory elements may be included in one or more SPCs 305 and/or in one or more machine processing circuits 306. Additionally, a memory, such as memory 304, may be implemented as a hierarchy of memory devices and/or technologies that may allow for various sizes and/or memory access speeds. Further, a memory, such as memory 304, may store one or more sets of parameters comprising one or more hotword models (e.g., neural network models), for example.

Figure 4:
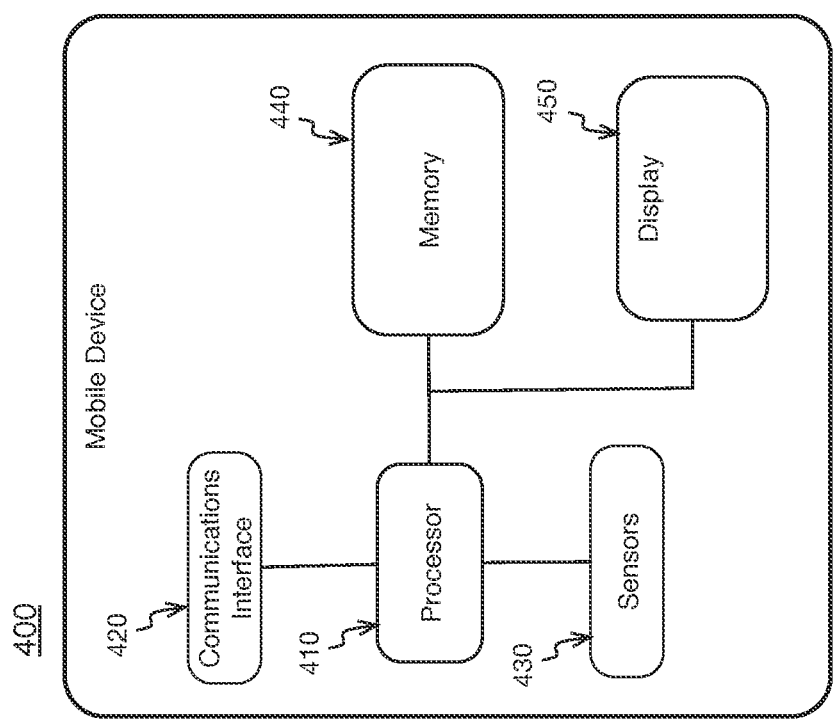
FIG. 4 is a schematic block diagram of an embodiment of an example mobile device.

FIG. 4 is a schematic block diagram of an embodiment 400 of an example mobile device, such as depicted in FIG. 1. In an implementation, a mobile device, such as 400, may comprise one or more processors, such as processor 410, and/or may comprise one or more communications interfaces, such as communications interface 420. In an implementation, one or more communications interfaces, such as communications interface 420, may enable wireless communications between a mobile device, such as mobile device 400, and one or more other computing devices, including for example, one or more wearable electronic audio devices, such as earbud 200. In an implementation, wireless communications may occur in accordance with a Bluetooth protocol, such as Bluetooth Core Specification 4.2, published by Bluetooth SIG in December, 2014, although claimed subject matter is not limited in scope in this respect. Other example wireless communication protocols, standards, and/or conventions in accordance with claimed subject matter are mentioned below, although, again, claimed subject matter is not limited in scope to the specific examples provided herein.

In an implementation, a mobile device, such as mobile device 400, may include a memory, such as memory 440. In an implementation, memory 440 may comprise a non-volatile memory, for example. Also, in an implementation, memory 440 may store audio recording content, such as one or more voice recordings, voicemail messages, etc. In an implementation, processor 410 may execute an application that may generate a customized hotword model based at least in part on audio recording content stored in memory 440. In another implementation, processor 410 may execute an application that may transmit audio recording content to an external device, such as server computing platform 170, for example, to have generated one or more hotword models. Hotword models obtained from server 170, for example, may be stored in memory 440 and/or may be transmitted to earbuds 200L and/or 200R via communication interface 420.

In an implementation, a mobile device, such as mobile device 400, may further comprise one or more sensors, such as one or more sensors 430. Sensors 430 may comprise, for example, one or more cameras, accelerometers, gyroscopes, thermometers, magnetometers, barometers, light sensors, or proximity sensors, or a combination thereof. Of course, these are merely example types of sensors that may be included in a mobile device, and claimed subject matter is not limited in scope to these particular examples.

Further, in an implementation, mobile device 400 may include a display 450. In an implementation, display 450 may comprise a touch-screen user interface, for example, by which a user, such as user 150, may interact with one or more applications executed by processor 410. Through touch-screen display 450, in an implementation, user 150 may specify particular hotword models for earbuds 200L and/or 200R and/or may specify particular metadata parameters associated with specified hotword models, as discussed previously.

Figure 5:
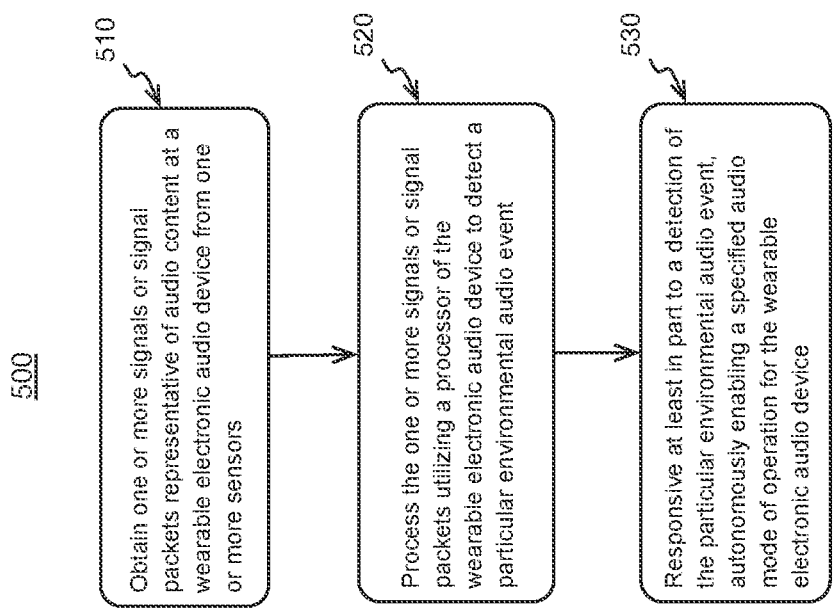
FIG. 5 is an illustration depicting an embodiment of an example process for autonomously enabling a specified audio mode of operation for a wearable electronic audio device responsive to detection of a particular environmental audio event.

FIG. 5 is an illustration depicting an embodiment 500 of an example process for autonomously enabling a specified audio mode of operation for a wearable electronic device responsive to detection of a particular environmental audio event. Embodiments in accordance with claimed subject matter may include all of blocks 510-530, fewer than blocks 510-530, and/or more than blocks 510-530. Likewise, it should be noted that content acquired or produced, such as, for example, input signals, output signals, operations, results, etc. associated with example embodiment 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, operations performed as depicted in blocks 510-530 may be executed at a wearable electronic audio device, such as one or more of earbuds 200L and/or 200R, for example.

As depicted at block 510, one or more signals or signal packets representative of audio content may be obtained at a wearable electronic audio device, such as one or more of earbuds 200L and/or 200R, from one or more sensors, in an implementation. For example, earbuds 200L and/or 200R may comprise one or more microphones, such as microphone 210. In an implementation, microphone 210 may transform sound pressure waves comprising environmental sounds into electrical audio signals, as explained above. As also explained above, environmental audio signals may be converted to digital audio signals at least in part by analog-to-digital converter circuitry 224, in an implementation Additionally, in an implementation, one or more electrical audio signals representative of environmental sounds captured at microphone 110, for example, may be processed by a processor of a wearable electrical audio device, such as one or more of earbuds 200L and/or 200R, to detect a particular environmental audio event, as depicted at block 520. For example, as explained more fully above, a processor, such as co-processor 300, may compare digital environmental audio signals, such as provided by analog-to-digital converter circuitry 224, with one or more sets of parameters comprising one or more specified hotword models. As also explained above, hotword models may be trained or otherwise designed to detect particular environmental audio events.

As depicted in block 530, at least in part in response to a detection of a particular environmental audio event, a specified audio mode of operation for a wearable electronic audio device may be autonomously enabled. For example, hotword detection co-processor 300 may indicate to processor 232 that a specified environmental audio event has been detected. In an implementation, processor 232 may enable an environmental audio passthrough amplification mode of operation in a wearable electronic audio device, such as one or more of earbuds 200L and/or 200R, for example.

As discussed above, a user may benefit from autonomous environmental audio passthrough amplification, such as may be implemented in example wearable electronic audio device embodiments described herein, even in circumstances where it would be impossible for a user to be aware of advantages to be gained from entering an environmental audio passthrough amplification mode. For example, a user may benefit from environmental audio passthrough amplification without having to take any explicit action and/or without even being aware of opportunities to benefit from environmental audio passthrough amplification in those moments.

Figure 6:
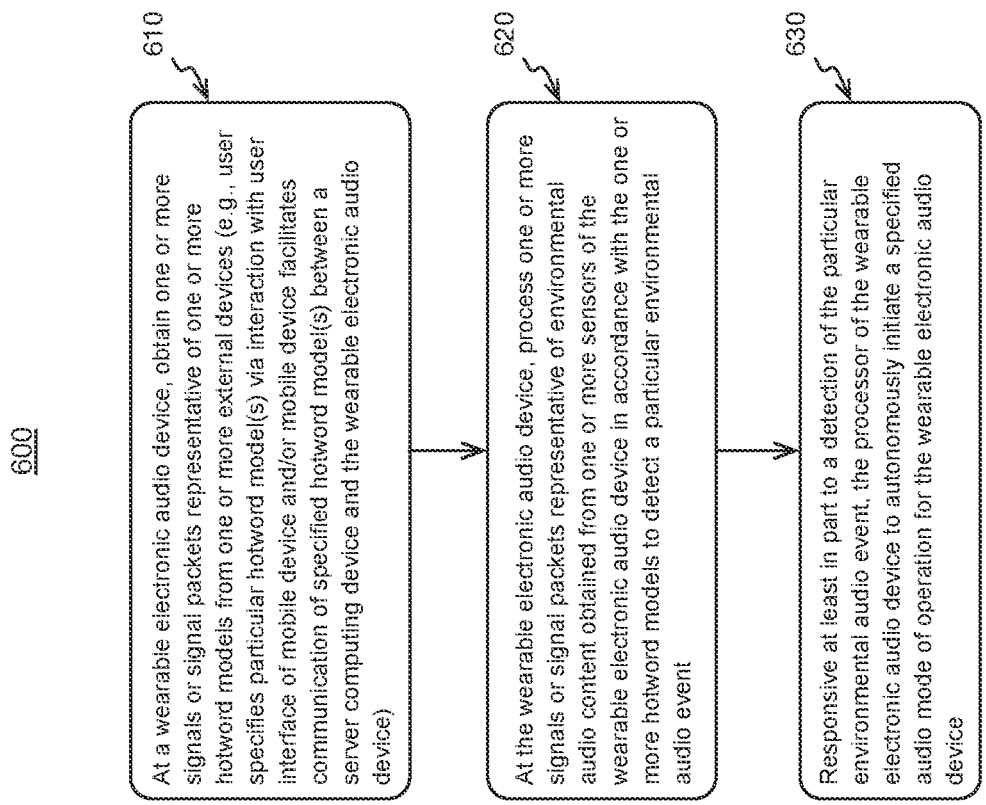
FIG. 6 is an illustration depicting an embodiment of an example process for communicating one or more hotword models between a server and a wearable electronic audio device, wherein the user to specify the one or more hotword models via interaction with a user interface of a mobile device.

FIG. 6 is an illustration depicting an embodiment 600 of an example process for communicating one or more hotword models between a server, such as server computing platform 170, and a wearable electronic audio device, such as one or more of earbuds 200L and/or 200R, wherein the user to specify the one or more hotword models via interaction with a user interface of a mobile device, such as mobile device 400. Embodiments in accordance with claimed subject matter may include all of blocks 610-630, fewer than blocks 610-630, and/or more than blocks 610-630. Likewise, it should be noted that content acquired or produced, such as, for example, input signals, output signals, operations, results, etc. associated with example embodiment 600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, one or more operations performed as depicted in blocks 610-630 may be executed at a wearable electronic audio device, such as one or more of earbuds 200L and/or 200R, for example.

For example, as depicted at block 610, one or more signals or signal packets representative of one or more hotword models may be obtained from one or more external devices at a wearable electronic audio device, such as one or more of earbuds 200L and/or 200R. For example, a user may specify one or more particular hotword models via interaction with a user interface of a mobile device, such as mobile device 400. Mobile device 400, in an implementation, may facilitate communication of specified hotword models from a server, such as server computing platform 170, to a wearable electronic audio device, such as one or more of earbuds 200L and/or 200R, for example. In an implementation, mobile device 400 may communicate with server computing platform 170 over network 180, which may comprise, for example, the Internet. Mobile device 400 may also communicate with a wearable electronic audio device, such as earbuds 200L and/or 200R, via a wireless Bluetooth connection, for example.

Additionally, in an implementation, one or more electrical audio signals representative of environmental sounds captured at microphone 110, for example, may be processed by a processor, such as co-processor 300, of a wearable electrical audio device, such as one or more of earbuds 200L and/or 200R, to compare the environmental audio content with the one or more hotword models to detect a particular environmental audio event, as depicted at block 520.

Further, as depicted in block 530, at least in part in response to a detection of a particular environmental audio event, a processor of a wearable electronic audio device, such as processor 232 of earbud 200, may autonomously enable an environmental audio passthrough amplification mode of operation for earbud 200, for example.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

A "signal measurement" and/or a "signal measurement vector" may be referred to respectively as a "random measurement" and/or a "random vector," such that the term "random" may be understood in context with respect to the fields of probability, random variables and/or stochastic processes. A random vector may be generated by having measurement signal components comprising one or more random variables. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the abovementioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 7:
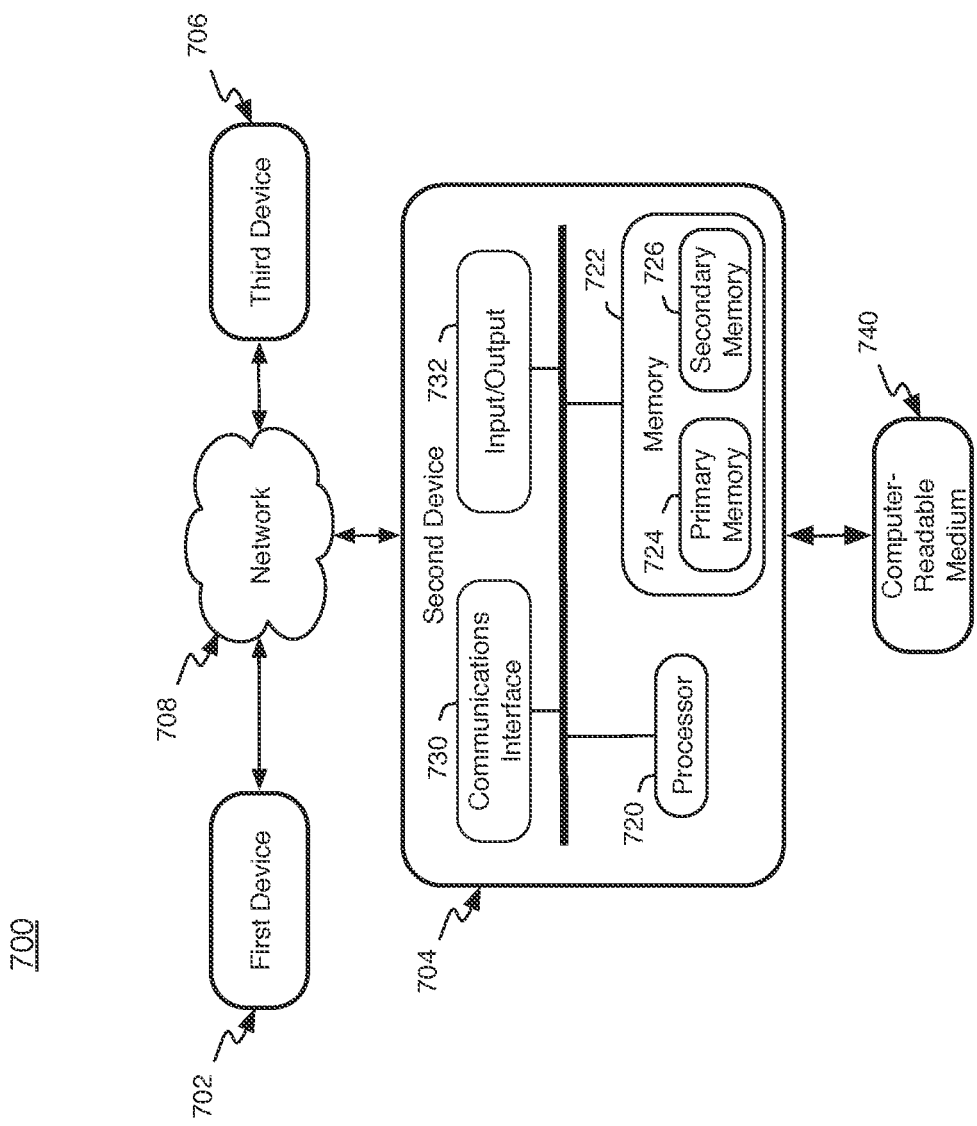
FIG. 7 is a schematic diagram depicting an embodiment of an example computing device.

In one example embodiment, as shown in FIG. 7, a system embodiment may comprise a local network (e.g., device 704 and medium 740) and/or another type of network, such as a computing and/or communications network. For purposes of illustration, therefore, FIG. 7 shows an embodiment 700 of a system that may be employed to implement either type or both types of networks. Network 208 may comprise one or more network connections, links, processes, services, applications, and/or resources to facilitate and/or support communications, such as an exchange of communication signals, for example, between a computing device, such as 702, and another computing device, such as 706, which may, for example, comprise one or more client computing devices and/or one or more server computing device. By way of example, but not limitation, network 708 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device" "processor" and/or similar terms; however, if it is determined, for some reason not immediately apparent, that the foregoing understanding cannot stand and that 35 USC § 112 (f), therefore, necessarily is implicated by the use of the term "computing device" "processor" and/or similar terms, then, it is intended, pursuant to that statutory section, that corresponding structure, material and/or acts for performing one or more functions be understood and be interpreted to be described at least in FIGS. 1-6 and in the text associated with the foregoing figure(s) of the present patent application.

Referring now to FIG. 7, in an embodiment, first and third devices 702 and 706 may be capable of rendering a graphical user interface (GUI) for a network device and/or a computing device, for example, so that a user-operator may engage in system use. Device 704 may potentially serve a similar function in this illustration. Likewise, in FIG. 7, computing device 702 ('first device' in figure) may interface with computing device 704 ('second device' in figure), which may, for example, also comprise features of a client computing device and/or a server computing device, in an embodiment. Processor (e.g., processing device) 720 and memory 722, which may comprise primary memory 724 and secondary memory 726, may communicate by way of a communication bus 715, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 7, computing device 702 may provide one or more sources of executable computer instructions in the form physical states and/or signals (e.g., stored in memory states), for example. Computing device 702 may communicate with computing device 704 by way of a network connection, such as via network 708, for example. As previously mentioned, a connection, while physical, may not necessarily be tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a computer-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

Embodiments described herein may be directed to a method, comprising: obtaining one or more signals or signal packets representative of audio content at a wearable electronic audio device from one or more sensors. In an implementation, one or more signals or signal packets may be processed utilizing a processor of the wearable electronic audio device to detect a particular environmental audio event. Also, in an implementation, responsive at least in part to a detection of the particular environmental audio event, a specified audio mode of operation for the wearable electronic audio device may be autonomously enabled at the wearable audio electronic device.

In an implementation, a wearable electronic audio device may comprise one or more wearable audio devices. Further, in an implementation, enabling a specified audio mode of operation may comprise enabling an environmental audio passthrough amplification mode. Also, in an implementation, enabling an environmental audio passthrough amplification mode may comprise amplifying one or more audio signals derived at least in part from one or more environmental audio signals obtained from one or more sensors. Additionally, in an implementation, enabling an environmental audio passthrough amplification mode may further comprise imparting a response in one or more audio drivers of a wearable electronic audio device to enable a wearer of the wearable electronic audio device to hear an audible representation of the one or more environmental audio signals. In an implementation, enabling the environmental audio passthrough amplification mode further comprises reducing a magnitude of an audio signal representative of non-environmental audio content being consumed by the wearer.

Further, in an implementation, processing one or more signals or signal packets utilizing a processor of a wearable electronic audio device to detect a particular environmental audio event may comprise processing at least a portion of one or more signals or signal packets representative of audio content obtained from one or more sensors in accordance with one or more hotword models. Also, in an implementation, one or more hotword models may include a hotword model representative of a name of a wearer of the wearable electronic audio device and/or a name of a domestic partner of the wearer of the wearable electronic audio device.

Also, in an implementation, a particular environmental audio event may comprise a machine-detectable sound emanated from an external electronic device. In an implementation, the machine-detectable sound emanated from the safety device may comprise an audio signal having a frequency distribution outside of the range of human hearing. In an implementation, a method may further comprise obtaining one or more hotword models at the wearable electronic audio device from a mobile device via a local wireless connection.

Embodiments described herein may also include a wearable electronic audio device, comprising: one or more sensors to generate one or more signals or signal packets representative of audio content; and at least one processor to detect a particular environmental audio event based at least in part on the audio content, wherein the at least one processor further to autonomously enable a specified audio mode of operation for the wearable electronic audio device responsive at least in part to a detection of the particular environmental audio event.

In an implementation, to enable a specified audio mode of operation, at least one processor to enable an environmental audio passthrough amplification mode. Further, in an implementation, a wearable electronic audio device may further include at least one audio signal amplification circuit; and one or more audio drivers, wherein to enable the environmental audio passthrough amplification mode, the at least one processor further to enable the at least one audio amplification circuit to amplify one or more audio signals derived at least in part from one or more environmental audio signals or signal packets to be obtained from the one or more sensors to impart a response in the one or more audio drivers to enable a wearer of the wearable electronic audio device to hear an audible representation of the one or more environmental audio signals or signal packets.

In an implementation, to enable an environmental audio passthrough amplification mode, at least one processor further to affect a reduction of a magnitude of an audio signal representative of non-environmental audio content being consumed by the wearer. Also, to detect a particular environmental audio event, at least one processor to process at least a portion of one or more signals or signal packets representative of audio content obtained from one or more sensors in accordance with one or more hotword models. In an implementation, a device may further comprise at least one communication interface circuit, wherein at least one processor to obtain one or more hotword models from an external device via at least one communication interface. Further, in an implementation, at least one processor to comprise a co-processor substantially dedicated to processing audio content representative of environmental audio signals or signal packets obtained from one or more sensors, or a combination thereof, in accordance with one or more hotword models to detect a particular environmental audio event.

Embodiments described herein may also comprise: obtaining one or more signals or signal packets representative of one or more hotword models at a wearable electronic audio device from one or more external devices; processing, utilizing a processor of the wearable electronic device, one or more signals or signal packets representative of environmental audio content obtained from one or more sensors of the wearable electronic device in accordance with the one or more hotword models to detect a particular environmental audio event; and responsive at least in part to a detection of the particular environmental audio event, the processor of the wearable electronic audio device to initiate a specified audio mode of operation for the wearable electronic audio device. In an implementation, obtaining one or more signals or signal packets representative of one or more hotword models from the one or more external devices may comprise a wearable electronic device communicating with a server computing device via a mobile device to obtain one or more particular hotword models specified at least in part via interaction with a user interface of the mobile device by a wearer of a wearable electronic audio device. Further, in an implementation, obtaining the one or more signals or signal packets representative of the one or more hotword models from the one or more external devices may include the wearable electronic device autonomously communicating with the external device responsive at least in part to a change in wearable electronic device context to automatically load one or more hotword models more currently relevant in light of the change in context.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   detecting, utilizing a processor of a wearable electronic audio device, a change in context for the wearable electronic audio device based at least in part on one or more signals or signal packets obtained from one or more sensors;
   autonomously obtaining, at the wearable electronic audio device, one or more signals or signal packets representative of one or more hotword models currently relevant to a detected change in context for the wearable electronic audio device from an external device responsive at least in part to the detected change in context;
   processing, utilizing the processor of the wearable electronic audio device, one or more signals or signal packets representative of environmental audio content obtained from the one or more sensors to detect a particular environmental audio event of a plurality of environmental audio events in accordance with the one or more hotword models; and
   responsive at least in part to a detection of the particular environmental audio event, autonomously enabling a particular audio mode of operation for the wearable audio electronic device.

2. The method of claim 1, wherein the enabling the particular audio mode of operation comprises enabling an environmental audio passthrough amplification mode of operation including amplifying one or more audio signals derived at least in part from one or more environmental audio signals obtained from the one or more sensors.

3. The method of claim 2, wherein the enabling the environmental audio passthrough amplification mode further comprises imparting a response in one or more audio drivers of the wearable electronic audio device to enable a wearer of the wearable electronic audio device to hear an audible representation of the one or more environmental audio signals.

4. The method of claim 3, wherein the enabling the environmental audio passthrough amplification mode further comprises reducing a magnitude of an audio signal representative of non-environmental audio content being consumed by the wearer.

5. The method of claim 1, wherein the detecting the change in context comprises detecting a change in location, time of day, speed of travel, or weather, or a combination thereof.

6. The method of claim 1, wherein the one or more hotword models includes a hotword model representative of a name of a wearer of the wearable electronic audio device and/or a name of a domestic partner of the wearer of the wearable electronic audio device.

7. The method of claim 1, wherein the particular environmental audio event comprises a machine-detectable sound emanated from an external electronic device.

8. The method of claim 7, wherein the machine-detectable sound emanated from the external electronic device comprises an audio signal having a frequency distribution outside of a range of human hearing.

9. The method of claim 1, wherein the obtaining the one or more signals or signal packets representative of the one or more hotword models comprises obtaining the one or more signals or signal packets representative of the one or more hotword models from the external device via a local wireless connection.

10. A wearable electronic audio device, comprising:
one or more sensors; and
at least one processor to
detect a change in context for the wearable electronic audio device based at least in part on one or more signals or signal packets obtained from the one or more sensors,
obtain one or more signals or signal packets representative of one or more hotword models currently relevant to a detected change in context for the wearable electronic audio device from an external device responsive at least in part to the detected change in context,
detect a particular environmental audio event of a plurality of environmental audio events based at least in part on one or more signals or signal packets representative of environmental audio content obtained from the one or more sensors and further based at least in part on the one or more hotword models, and
responsive at least in part to a detection of the particular environmental audio event, autonomously enable a particular audio mode of operation for the wearable electronic audio device.

11. The wearable electronic audio device of claim 10, further comprising:
at least one audio signal amplification circuit; and
one or more audio drivers, wherein to enable the particular audio mode of operation, the at least one processor further to enable the at least one audio signal amplification circuit to amplify one or more audio signals derived at least in part from one or more environmental audio signals or signal packets obtained from the one or more sensors to impart a response in the one or more audio drivers to enable a wearer of the wearable electronic audio device to hear an audible representation of the one or more environmental audio signals or signal packets.

12. The wearable electronic audio device of claim 10, wherein to enable the particular audio mode of operation, the at least one processor further to affect a reduction of a magnitude of an audio signal representative of non-environmental audio content being consumed by a wearer of the wearable electronic audio device.

13. The wearable electronic audio device of claim 10, wherein to detect the change in context, the at least one processor to detect a change in location, time of day, speed of travel, or weather, or a combination thereof.

14. The wearable electronic audio device of claim 10, further comprising at least one wireless communication interface circuit, wherein the at least one processor to obtain the one or more signals or signal packets representative of the one or more hotword models from the external device via the at least one wireless communication interface circuit.

15. The wearable electronic audio device of claim 10, wherein to detect the change in context, the at least one processor to detect a wearer of the wearable electronic audio device going for a walk, and wherein the one or more hotword models to be directed to detection of pedestrian safety signals.

16. A method, comprising:
obtaining one or more signals or signal packets representative of one or more hotword models at a wearable electronic audio device from one or more external devices, including the wearable electronic audio device autonomously communicating with the one or more external devices responsive at least in part to a change in wearable electronic audio device context to automatically load one or more hotword models more currently relevant in light of the change in context;
processing, utilizing a processor of the wearable electronic audio device, one or more signals or signal packets representative of environmental audio content obtained from one or more sensors of the wearable electronic audio device in accordance with the one or more hotword models to detect a particular environmental audio event of a plurality of environmental audio events; and
responsive at least in part to a detection of the particular environmental audio event, the processor of the wearable electronic audio device to initiate an environmental audio passthrough mode of operation for the wearable electronic audio device.

17. The method of claim 16, wherein the obtaining the one or more signals or signal packets representative of the one or more hotword models from the one or more external devices comprises the wearable electronic audio device communicating with a server computing device via a mobile device to obtain.

18. The method of claim 16, wherein the processor of the wearable electronic audio device to initiate the environmental audio passthrough mode of operation for a particular amount of time specified for the one or more hotword models.

* * * * *